Feb. 20, 1934.   C. C. FARMER   1,947,701
PISTON AND PACKING RING
Filed April 9, 1928
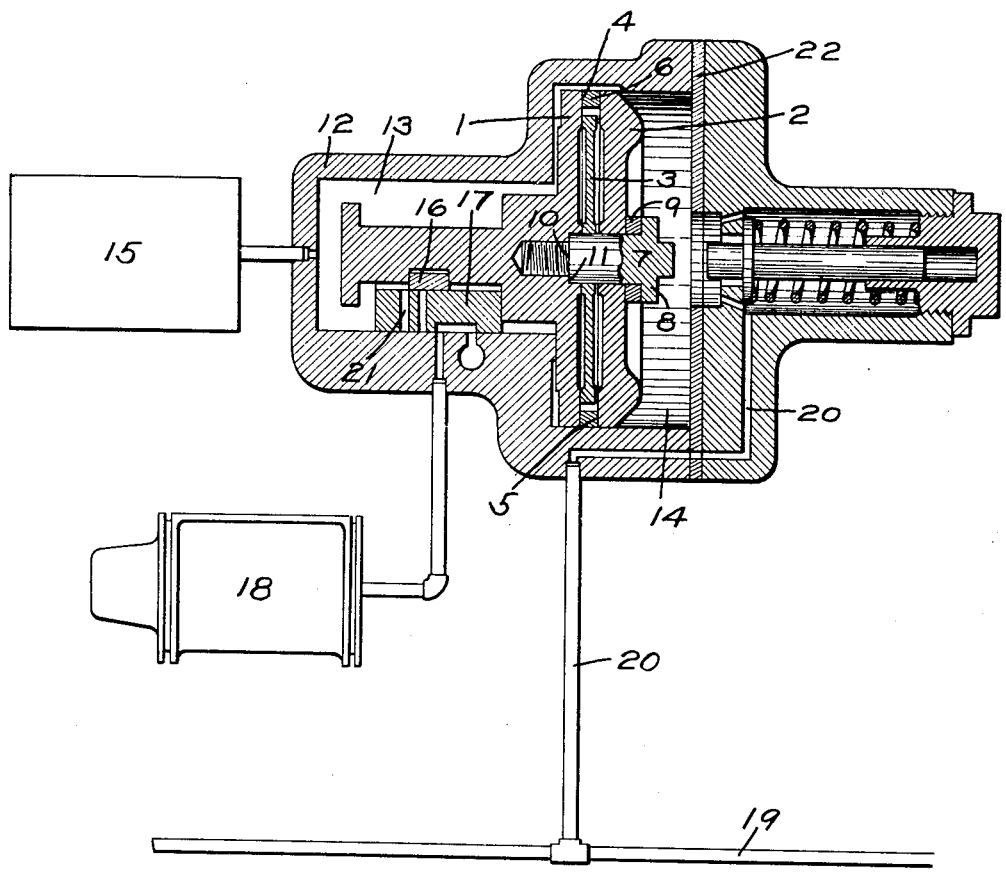
INVENTOR
CLYDE C. FARMER
BY Wm. M. Cady
ATTORNEY Patented Feb. 20, 1934

1,947,701

UNITED STATES PATENT OFFICE 1,947,701

PISTON AND PACKING RING

Clyde C. Farmer, Pittsburgh, Pa., assignor to The Westinghouse Air Brake Company, Wilmerding, Pa., a corporation of Pennsylvania Application April 9, 1928. Serial No. 268,478

1 Claim. (Cl. 309—4)

This invention relates to pistons and more particularly to pistons for use in fluid pressure systems.

The principal object of my invention is to provide a piston in which the proper operative relationship between the piston and piston packing ring is maintained at all times, regardless of wear which may occur on the sides of the packing ring and the sides of the packing ring groove.

Another object of my invention is to provide a piston in which the wear of the cooperating bearing surfaces of the piston and piston packing ring is automatically taken up.

Another object of my invention is to provide a piston having a pair of piston plates and a packing ring mounted between said plates, with means for preventing leakage of fluid under pressure from one side of the piston to the other through the piston.

A further object of my invention is to provide a piston which is made of a plurality of separable parts to facilitate the accurate finishing of the packing ring bearing surfaces with which some of the parts are provided.

Other objects and advantages will appear from the following more detailed description of my invention.

In the accompanying drawing, the single figure is a diagrammatic view, partly in section, of a triple valve device embodying a piston made in accordance with my invention.

As shown in the drawing, my improved piston comprises discs 1 and 2, between which is interposed a stop member 3. The opposing faces of the discs 1 and 2 are provided with annular bearing surfaces 4 and 5 between which a packing ring 6 is operatively mounted, which ring maintains the discs in spaced relation to each other.

Passing through openings formed centrally of the disc 2 and the stop member 3, and having screw-threaded connection with the disc 1, is a stem or bolt 7 having, at its outer end, an enlargement or head 8. Interposed between the head 8 and the outer face of the disc 2 there is a resilient member, such as a rubber gasket 9, which when the bolt 7 is screwed in place, will tend to urge the discs 1 and 2 toward each other and thus maintain the bearing surfaces 4 and 5 in operative engagement with the sides of the packing ring 6.

The disc 2 is slidably mounted on the bolt 7, so that, as the bearing surfaces 4 and 5 and the sides of the packing ring wear, the pressure of the gasket 9, acting upon the disc 1, through the medium of the bolt 7, and directly upon the disc 2, urges the discs toward each other, thus maintaining the discs in operative engagement with the packing ring, regardless of wear.

The piston ring 6 must be permitted to expand and contract freely as the piston operates, and to prevent the compression of the gasket 9 to such an extent that the pressure of the discs on the ring will prevent the proper operation of the ring, an annular shoulder 10 is formed on the bolt 7 which is adapted to engage a corresponding shoulder 11 formed on the disc 1. When the shoulders 10 and 11 are in engagement the gasket 9 will be compressed sufficiently to maintain the discs 1 and 2 in proper operative engagement with the packing ring and compensate for any wear which may occur between the surfaces 4 and 5 and the sides of the ring.

The gasket 9, besides serving to maintain the discs 1 and 2 in operative engagement with the packing ring 6, also serves as a seal to prevent leakage of fluid under pressure from one side of the piston to the other, which leakage might occur between the packing ring 6 and the discs 1 and 2 to the space between the discs and from thence between the disc 2 and the bolt 7.

The width of the stop member 3 is less than that of the packing ring 6, so that this member will not interfere with the movement of the discs 1 and 2 as they are adjusted to compensate for wear. The diameter of this member 3 is less than the inside diameter of packing ring and is adapted to prevent the ring 6 from moving out of engagement with the surfaces 4 and 5 of the discs when the parts of the piston are being assembled or when the piston is being inserted in a cylinder.

The opposing faces of the discs 1 and 2 are free from integral protuberances which project outwardly beyond the surfaces 4 and 5 so that when the parts of the piston are disassembled, the finishing of the surfaces 4 and 5 by machinery or grinding is facilitated.

In the drawing, my improved piston has been shown applied to a triple valve device for use in fluid pressure brake systems, which valve device comprises a casing 12. In this embodiment of the invention, the gasket 9, as hereinbefore described, prevents leakage of fluid under pressure from a chamber 13 at one side of the piston to a chamber 14 at the other side of the piston. The chamber 13 is connected to an auxiliary reservoir 15, and through the operation of a graduating slide valve 16 and slide valve 17 is adapted to be connected with the brake cylinder 18. The chamber 14 is connected to the brake pipe 19 by way of a passage and pipe 20. When the piston moves to its emergency position, due to the sudden venting of fluid under pressure from the brake pipe, a port 21 in the slide valve 17 connects the chamber 13 to the piston chamber of the brake cylinder so that fluid under pressure from the auxiliary reservoir 15 will flow to the piston chamber of the brake cylinder. It will thus be seen that, to maintain the brakes applied, fluid under pressure in the brake cylinder and auxiliary reservoir and chamber 13 must not be permitted to leak away, and to prevent any such leakage through the piston, the gasket 9 is provided. Leakage past the ring 6 will be prevented from flowing to the brake pipe by the disc 2 sealing against a gasket 22.

While one illustrative embodiment of the invention has been described in detail, it is not my intention to limit its scope to that embodiment or otherwise than by the terms of the appended claim.

Having now described my invention, what I claim as new and desire to secure by Letters Patent, is:—

In a piston, the combination with a pair of relatively movable discs, of a packing ring slidably mounted between said discs, means adapted to maintain said discs in operative engagement with said ring as said ring and discs wear, said means comprising a resilient gasket and a bolt for compressing said gasket, and a piston ring stop carried by said bolt and interposed between said discs, said stop being separate from both discs and of less width than the width of the piston ring.

CLYDE C. FARMER.